United States Patent [19]

Bortinger

[11] Patent Number: 5,480,853
[45] Date of Patent: Jan. 2, 1996

[54] PHOSPHORUS/VANADIUM CATALYST PREPARATION

[75] Inventor: Arie Bortinger, Ridgewood, N.J.

[73] Assignee: Scientific Design Company, Inc., Little Ferry, N.J.

[21] Appl. No.: 276,040

[22] Filed: Jul. 15, 1994

[51] Int. Cl.$^6$ .................................................. B01J 27/06
[52] U.S. Cl. ........................... 502/224; 502/51; 502/209
[58] Field of Search ........................... 502/51, 209, 224

[56] References Cited

U.S. PATENT DOCUMENTS

| | | | |
|---|---|---|---|
| 4,002,650 | 1/1977 | Bremer et al. | 260/346.8 A |
| 4,043,943 | 8/1977 | Schneider | 252/437 |
| 4,569,925 | 2/1986 | Yang et al. | 502/209 |
| 5,137,860 | 8/1992 | Ebner et al. | 502/209 |
| 5,348,927 | 9/1994 | Bortinger | 502/209 |
| 5,364,824 | 11/1994 | Andrews et al. | 502/209 |
| 5,401,207 | 3/1995 | Beninger et al. | 502/209 |

*Primary Examiner*—Michael Lusignan
*Attorney, Agent, or Firm*—William C. Long

[57] ABSTRACT

A vanadium/phosphorus mixed oxide catalyst containing not more than 0.2 wt % chloride is produced by drying chloride containing catalyst precursor at 100°–180° C., calcining the dried precursor, preferably under nitrogen, at 200°–300° C. and activating the calcined precursor at 350°–550° C. with a gas containing oxygen and a reducing agent such as propane, and preferably steam.

12 Claims, No Drawings

5,480,853

PHOSPHORUS/VANADIUM CATALYST PREPARATION

BACKGROUND OF THE INVENTION

1. Field of the Invention

The present invention relates to an improved method for the production of an activated vanadium/phosphorus mixed oxide catalyst, substantially free of chloride and volatile materials, from precursors thereof, the catalyst having special utility in the production of maleic anhydride.

2. Description of the Prior Art

Catalysts containing vanadium and phosphorus oxides have been used in the oxidation of 4-carbon atom hydrocarbons, such as n-butane, with molecular oxygen or oxygen containing gas to produce maleic anhydride. Conventional methods of preparing these catalysts involve reducing a pentavalent vanadium compound, and if desired, promoter element compounds under conditions which will provide or maintain vanadium in a valence state below +5 to form catalyst precursors which are recovered and calcined.

Hydrogen chloride has been used as a reducing agent for vanadium compounds where vanadium has a +5 valence. The use of gaseous HCl as a reducing agent is disclosed in U.S. Pat. No. 4,002,650 where the vanadium and phosphorus components are reacted in an aqueous solution. The use of gaseous HCl as a reducing agent for vanadium compounds such as $V_2O_5$ is also described in U.S. Pat. No. 4,043,943 where the vanadium and phosphorus components are reacted in liquid organic medium.

U.S. Pat. No. 5,137,860 provides a comprehensive description of the prior art in this area. The patent shows the use of organic reducing agents as well as hydrogen chloride and teaches the use of activation procedures whereby the catalyst precursor without calcination is contacted at prescribed conditions with oxygen and steam mixtures and finally with a non-oxidizing steam atmosphere to produce an active catalyst.

U.S. Pat. No. 4,569,925 describes the preparation of vanadium/phosphorus mixed oxide catalysts by an organic solution method using anhydrous hydrogen chloride as an agent for the solubilization of the vanadium component, and teaches an activation procedure whereby the catalyst precursor is contacted not with air alone but with a mixture of air and a hydrocarbon such as methane, ethane, propane, butane and the like.

There are problems associated with the use of hydrogen chloride in the preparation of PVO catalysts. Even after calcination to prepare the catalyst, residual chloride remains in the catalyst. The chloride is generally removed during the catalyst activation period in the reactor, but chloride release from the solid catalyst into the reactor and the downstream equipment in the process is undesirable. The main problems are: possible equipment corrosion, product loss during chloride liberation and increased waste disposal. It would be advantageous to remove the chloride at the point of catalyst manufacture or at least before it is exposed to hydrocarbon feed in the reactor.

BRIEF SUMMARY OF THE INVENTION

The present invention provides a method for preparing a vanadium/phosphorus oxide catalyst suitable for maleic anhydride production. The method of the invention is especially suitable for producing a catalyst at the manufacturing site which can be loaded into the reactor tubes wherein it will be used and quickly brought to its final activated state with minimum difficulties. A special advantage is that the method of the invention removes chloride and other volatile material thus producing a catalyst material which can be loaded in a reactor and brought to final activation rapidly and without the problems previously encountered.

In accordance with the invention, a mixed vanadium/phosphorus oxide catalyst precursor is prepared by organic solution procedures which involve the use of hydrogen chloride. The precursor is dried, for example, at temperatures up to about 180° C. and then calcined at temperatures up to about 300° C. whereby substantial amounts of volatile materials are separated. Finally the calcined material is contacted at elevated temperature with an oxygen containing gas which also contains a reducing agent, preferably a short chain hydrocarbon such as propane, and which preferably also contains steam for a time sufficient to activate the catalyst. This procedure effectively removes chloride and converts the vanadium/phosphorus mixed oxide catalyst precursor to a form for use, for example, in a commercial reactor.

DETAILED DESCRIPTION

The present invention provides a method for the preparation of an activated phosphorus/vanadium/oxygen catalyst which is especially useful in the oxidation of n-butane to maleic anhydride, the catalyst having a reduced amount of volatile materials and, at most a very low residual chloride content, i.e. 0.2 wt % chloride or lower, preferably 0.1 and most preferably 0.05 wt % chloride or lower.

Essentially, the catalyst of the invention is prepared from catalyst precursors which have been formed in accordance with known procedures. By the process of this invention the precursor is first dried at a temperature ranging from about 100°–180° C. for about 1–24 hours. The dried precursor is then calcined, preferably under nitrogen, at a temperature in the range of about 200°–300° C. for about 1–15 hours with removal of substantial amounts of volatile material. Finally, the calcined precursor is activated at temperatures in the range of about 350°–550° C. for about 1–10 hours by contact with a gas containing oxygen and an organic reducing agent which is preferably a short chain hydrocarbon such as propane. Preferably the gas contains steam as this is especially useful in reducing the residual chloride content of the catalyst.

A special advantage of the invention is the higher productivity of catalysts prepared in accordance as compared with catalysts which have been prepared by conventional procedures over hundreds of hours of initial operation.

Preferred catalysts are formed by reducing vanadium in the +5 valence state in a substantially anhydrous organic medium to a valence of less than +5 and digesting said reduced vanadium in concentrated phosphoric acid. The resultant catalyst complex is characterized as a mixed oxide, however, the structure of the complex has not been determined but may be conveniently represented by a formula such as $VP_aMe_yO_x$, 'a' is 0.90 to 1.3. Me is a metal such as Zn or Mo, an alkali metal or alkaline earth metal as known in the art as modifiers for catalysts of this type. This representation is not an empirical formula and has no significance other than representing the atom ratio of the components of the catalyst. The 'x' and 'y' in fact, have no determinant value and can vary widely depending on the combinations within the complex. That there is oxygen present is known, and the $O_x$ is representative of this. Suitable dried catalysts have a crystallinity of 30 to 90%, preferably at least 40%.

The improved catalyst which comprises in addition to P, V and O, Zn, Li, and Mo is that produced from an organic solution reduction of vanadium pentoxide wherein the organic solvent is an alcohol and the reduction of the vanadium is obtained by contacting it with HCl. This is conveniently carried out by passing gaseous HCl through the alcohol having the vanadium pentoxide suspended therein. The vanadium pentoxide is reduced by the HCl and brought into solution as the vanadyl chloride. The completion of the reduction is the appearance of a dark reddish brown solution and the dissolution of $V_2O_5$. It is preferred that the reduction temperature should be maintained at no greater than 60° C. and preferably less than 55° C. Optimally active catalyst are the result when the reduction is carried out temperatures in the range of about 35° C. to 55° C., preferably 37° C. to 50° C.

Generally in the catalyst preparation from 2,500 to 4,400 ml of alcohol, preferably 2,700 to 4,200 ml per pound of $V_2O_5$ and from 1.5 to 3.0 pounds of HCL per pound of $V_2O_5$ are employed.

To obtain the mixed oxides of vanadium and phosphorus, phosphoric acid of approximately 99% $H_3PO_4$ (98 to 101%) is added, for example, prepared from 85% $H_3PO_4$ and $P_2O_5$ or commercial grades of 105 and 115% phosphoric acid diluted with 85% $H_3PO_4$ or water to the final required concentration of $H_3PO_4$ and the vanadium compound digested which is discerned by a change in the color of the solution to a dark blue green, the alcohol is then stripped off to obtain a concentrated slurry which is thereafter dried to produce the dried catalyst precursors.

The digestion of the vanadium compound in the phosphoric acid is normally conducted at reflux until the color change indicated the completed digestion.

The final removal of alcohol is carried out in a drying step in an oven at a temperature in the range of 100° to 180° C. for 1–24 hours. Lower temperatures and longer times can be used. Reduced pressure can also be applied to lower oven temperatures. Following drying, calcination of the dried catalyst precursor is carried out at a temperature in the range of about 200° to 300° C. for a sufficient period to improve the catalytic properties of the composition and remove volatile materials, usually 1–15 hours.

Following calcination, the catalyst precursor is activated by contact with a gas containing oxygen and an organic reducing agent, and preferably steam. This contact takes place at 350°–550° C., for about 1–10 hours and results in the formation of catalyst which can then be used in the production of maleic anhydride. Where the catalyst is ultimately to be used in the form of pellets in a fixed bed reactor, the catalyst precursor after drying and calcining can be formed into the final pellets and then activated or the precursor after drying and calcining can first be activated and then formed into pellets.

In the final activation, the calcined catalyst material is contacted at elevated temperature with a gas comprised of both molecular oxygen and an organic reducing agent. Most preferably the gas also contains steam and it may also comprise an inert gas component.

In general, the contact gas comprises by volume >0 to <100% oxygen, >0 to 2.1% reducing agent, >0 to <100% steam, and >0 to <100% inert gas. Preferred compositions comprise by volume 1 to 21% oxygen, 0.1 to 2% reducing agent, 1 to 60% steam and >0 to <90% inert.

Preferred inert gas is nitrogen although other known inert gases such as helium, argon and the like can be used.

It is important to avoid flammability problems during the activation, and for this reason it is advantageous to operate either in the oxygen rich regime and maintain reducing agent concentration below 2.1 vol % or in the oxygen lean regime where there is no limit on reducing agent concentration but oxygen concentration should be below about 6 vol%.

Preferred reducing agents are hydrocarbons, especially those having about 2 to 5 carbon atoms such as ethane, propane, butane, butene, butadiene, pentane, and the like. Other reducing agents such as hydrogen sulfide, carbon monoxide, and the like can be employed. The use of hydrocarbons having less than four carbon atoms is especially preferred since the use of such materials does not result in the formation of oxidation products which are difficult to recover and handle. Propane is an especially preferred reducing agent.

The preferred catalyst complex is characterized as a mixed oxide, however, the structure of the complex has not been determined but may be conveniently represented by a formula such as $VP_aZn_bMo_cLi_dO_x$ 'a' is 0.90 to 1.3, 'b' is 0.001 to 0.15, 'c' is 0.005 to 0.10 and 'd' is 0.001 to 0.15.

The organic solvent is preferably a primary or secondary alcohol such as methanol, ethanol, 1-propanol, 2-propanol, butanol, 2-butanol, 2,methyl-1-propanol, 3-methyl-2-butanol, 2,2-dimethyl-1-propanol, 1-hexanol, 4-methyl-1-pentanol, 1-heptanol, 4-methyl-1-hexanol, 4-methyl-1-heptanol, 1,2-ethanediol, glycerol, trimethylopropane, 4-methyl, 2-pentanone, diethylene glycol and triethylene glycol or mixtures thereof. The alcohol is also a mild reducing agent for the vanadium +5 compound.

Generally the atomic ratio of Zn to vanadium is in the range of 0.001 to 0.15:1, however it has been found that lower ratios of zinc/vanadium produce the most active catalyst and compositions containing Zn/V mole ration on the range of 0.01 to 0.07 are preferred.

The phosphorus is generally present in these catalysts as well as those of the prior art in the mole ratio of P/V 0.09–1.3/1. Optimum P/V ratios are found to be below 1.22/1 and above 1.0/1. The stabilizing effect of Mo allows the use of less phosphorus than otherwise comparable prior art catalyst and the concomitant benefit that phosphorus loss and the resulting deactivation of the catalyst in reactor operation is reduced, i.e. longer time trend (reactivity v. hours on stream).

The lithium component is present at an atomic ratio of 0.001 to 0.15:1, Li:V.

The lithium and zinc modifier components are added as the compound thereof such as acetates, carbonates, chlorides, bromides, oxides, hydroxides, phosphates and the like, e.g. zinc chloride, zinc oxide, zinc oxalate, lithium acetate, lithium chloride, lithium bromide, lithium carbonate, lithium oxide, or lithium orthophosphate and the like.

The molybdenum compound may be dissolved in an organic solvent, as described above or water and added to the reaction mixture. The solvent containing the molybdenum compound may be added with the other modifiers or at different times. If water is used the solvent containing the molybdenum compound is preferably added after the first digestion and prior to the second digestion. The use of a soluble molybdenum compound dissolved in a solvent according to the present invention for addition to the reaction mixture has been found to be particularly effective in dispersing the molybdenum throughout the mixture and the final dried catalyst. Some examples of suitable soluble molybdenum catalyst include phosphomolybdic acid, ammonium molybdate (VI) tetrahydrate, lithium molybdate, molybdenum tetrabromide, molybdenum trioxyhexachloride and the like.

The catalyst may be employed as pellets, disc, flakes, wafers, or any other convenient shape which will facilitate its use in the tubular reactors employed for this type of vapor phase reaction For example the catalyst may be prepared as tablets having a hole or bore therethrough as disclosed in U.S. Pat. No. 4,283,307 which is incorporated herein. The material can be deposited on a carrier. Although fixed bed tubular reactors are standard for this type of reaction, fluidized beds are frequently used for oxidation reactions, in which case the catalyst particle size would be on the order of about 10 to 150 microns.

The use of this class of catalyst for the partial oxidation of $C_4$–$C_{10}$ hydrocarbons to the corresponding anhydrides is generally recognized. They have been widely considered for the conversion of normal $C_4$ hydrocarbons, both the alkane, n-butane, and alkene, and alkene, n-butene, for the production of maleic anhydride, which has a wide commercial usage.

The oxidation of the n—$C_4$ hydrocarbon to maleic anhydride may be accomplished by contacting e.g. n-butane in low concentrations in oxygen with the described catalyst. Air is entirely satisfactory as a source of oxygen , but synthetic mixtures of oxygen and diluent gases, such as nitrogen also may be employed. Air enriched with oxygen may be employed.

The gaseous feed stream to the standard tubular oxidation reactors normally will contain air and about 0.5 to about 2.5 mole percent hydrocarbons such as n-butane. About 1.0 to about 2.0 mole percent of the n—$C_4$ hydrocarbon are satisfactory for optimum yield of product for the process of this invention. Although higher concentrations may be employed, explosive hazards may be encountered except in fluidized bed reactors where concentrations of up to about 4 or 5 mole percent can be used without explosive hazard. Lower concentrations of $C_4$, less than about one percent, or course, will reduce the total productivity obtained at equivalent flow rates and thus are not normally economically employed.

The flow rate of the gaseous stream through the reactor may be varied within rather wide limits but a preferred range of operations is at the rate of about 50 to 300 grams of $C_4$ per liter of catalyst per hour and more preferably about 100 to about 250 grams of $C_4$ per liter of catalyst per hour. Residence times of the gas stream will normally be less than about 4 seconds, more preferably less than about one second, and down to a rate where less efficient operations are obtained. The flow rates and residence times are calculated at standard conditions of 760mm of mercury and at 25° C. A preferred feed for the catalyst of the present invention for conversion to maleic anhydride is a n-$C_4$ hydrocarbon comprising a predominant amount of n-butane and more preferably at least 90 mole percent n-butane.

A variety of reactors will be found to be useful and multiple tube heat exchanger type reactors are quite satisfactory. The tubes of such reactors may vary in diameter from about ¼" to about 3", and the length may be varied from about 3 to about 18 or more feet. The oxidation reaction is an exothermic reaction and, therefore, relatively close control of the reaction temperature should be maintained. It is desirable to have the surface of the reactors at a relatively constant temperature and some medium to conduct heat from the reactors is necessary to aid temperature control. Such media may be Woods metal, molten sulfur, mercury, molten lead, and the like, but it has been found that eutectic salt baths are completely satisfactory. One such salt bath is a sodium nitrate-sodium nitrite-potassium nitrite eutectic constant temperature mixture. An additional method of temperature control is to sue a metal block reactor whereby the metal surrounding the tube acts as a temperature regulating body. As will be recognized by one skilled in the art, the heat exchange medium may be kept at the proper temperature by heat exchangers and the like. The reactor or reaction tubes may be iron, stainless steel, carbon-steel, nickel, glass tubes have excellent long life under the conditions for the reactions described herein. Normally, the reactors contain a preheat zone of an inert material such as ¼' Alundum pellets, inert ceramic balls, nickel balls or chips and the like, present at about ½ to 1/10 the volume of the active catalyst present.

The temperature of reaction may be varied within some limits, but normally the reaction should be conducted at temperatures within a rather critical range. The oxidation reaction is exothermic and once reaction is underway, the main purpose of the salt bath or other media is to conduct heat away from the walls of the reactor and control the reaction. Better operations are normally obtained when the reaction temperature employed is no greater than about 100° C. above the salt bath temperature. The temperature in the reactor, or course, will also depend to some extent upon the size of the reactor an the $C_4$ concentration. Under usual operating conditions in a preferred procedure, the temperature in the center of the reactor, measured by thermocouple, is about 365° C. to about 550° C. The range of temperature preferably employed in the reactor, measured as above, should be from about 380° C. to about 515° C. and the best results are ordinarily obtained at temperatures from about 380° C. to about 475° C. Described another way, in terms of salt bath reactors with carbon steel reactor tubes about 1.0" in diameter, the salt bath temperature will usually be controlled between about 350° C. to about 550° C. Under normal conditions, the temperature in the reactor ordinarily should not be allowed to go above about 475° C. for extended lengths of time because of decreased yields and possible deactivation of the catalyst.

The reaction may be conducted at atmospheric, super atmospheric or below atmospheric pressure. The exit pressure will be at least slightly higher than the ambient pressure to insure a positive flow from the reaction. The pressure of the inert gases must be sufficiently high to overcome the pressure drop through the reactor.

The maleic anhydride may be recovered in a number of ways well known to those skilled in the art. For example, the recovery may be by direct condensation or by absorption in suitable media, with subsequent separation and purification of the maleic anhydride.

EXAMPLES

The following typical catalyst preparative procedure was used: 3,600 ml anhydrous isobutanol and 636 grams $V_2O_5$ were charged into a 2 gallon Pfaudler reactor equipped with a mechanical stirrer, a gas inlet tube, thermowell, Dean stark trap with a condenser, and a heating jacket. About 3.5 lb hydrogen chloride gas were bubbled into the stirred suspension. The reaction temperature was maintained at 40°±3° C. To the resulting red-brown solution was added 9.5 grams anhydrous zinc chloride, 2.96 grams lithium chloride, 13.10 grams molybdenum trioxide and a solution of 794.8 grams of 99.3% phosphoric acid. An additional 1,223 ml of anhydrous isobutanol were added to the reaction mixture, the ratio of gal isobutanol/lb $V_2O_5$ being about 0.91. The resulting solution was refluxed for 1 hour. At the end of this digestion period the alcohol was stripped until about 3,600 ml distillate were removed resulting in a thick slurry. This slurry was then dried in an oven for 16 hours at 150° C.

The following table shows typical chloride content, vanadium valence and weight percent volatile materials for the dried catalyst material:

TABLE 1

|  | Sample 1 | Sample 2 |
|---|---|---|
| Wt % Cl | 0.951 | 1.01 |
| Vanadium valence | 3.94 | 4.03 |
| Volatile content, wt %* | 14.8 | 15.1 |

*Determined by weight loss upon heating at 515° C. for 2 hours.

Samples similarly preferred after the drying, were crushed and calcined at 260° C. for 3 hours under nitrogen. The following Table 2 shows the chloride content, vanadium valence and weight percent volatiles for the calcined samples:

TABLE 2

|  | Sample 3 | Sample 4 |
|---|---|---|
| Wt % Cl | 0.62 | 0.60 |
| Vanadium valence | 3.72 | 3.70 |
| Volatile content, wt % | 8.7 | 9.1 |

A comparison of Tables 1 and 2 demonstrates that the calcination results in a substantial reduction in both chloride and volatiles content of the catalyst material.

FIXED BED TESTS

Catalyst pellets were prepared from calcined precursor by adding 4% graphite and pelletizing to 3/16" by 3/16 tablets with a 1/16" central hole struck therethrough.

Pelletized catalyst precursor samples were charged to a 1"×5' tubular reactor to a total catalyst bed height of 3.5' and the reactor was heated up in a salt bath to activation temperature. The original chloride in the catalyst was 0.61 wt %. The gas fed to the reactor, the activation conditions and the amount of chloride removed are reported in TABLES 3 and 4.

TABLE 3

CATALYST PRECURSOR ACTIVATION WITH PROPANE TO REMOVE CHLORIDES
Catalyst Charge: about 350 g pellets
Feed: 1.5% Propane/Air; GHSV = 1500 h$^{-1}$;

| EXAMPLE | 1 | 2 | 3 | 4 |
|---|---|---|---|---|
| % Propane/air (1) | 1.5 | 0 | 1.5 | 1.5 |
| % Steam (2) | 0 | 0 | 0 | 20 |
| Salt Bath °C. | 400 | 400 | 415 | 400 |
| Time, Hrs | 5 | 5 | 5 | 5 |
| ANALYSIS OF CATALYST |  |  |  |  |
| % Cl Removed | 70 | 39 | 93 | 98 |
| SA, m$^2$/g | 11.3 | 9.3 | 23.1 | 23.1 |
| V$^{ox}$ | 4.13 | 4.37 | 4.16 | 4.07 |

*Comparative Example.
(1) Volume % propane in air.
(2) Volume % steam in feed.

TABLE 4

CATALYST PRECURSOR ACTIVATION WITH PROPANE TO REMOVE CHLORIDES
Catalyst Charge: about 350 g pellets
Feed: 0.8% Propane/Air; GHSV = 1500 h$^{-1}$;

| EXAMPLE | 5 | 6 | 7 | 8 |
|---|---|---|---|---|
| % Propane/air (1) | 0.8 | 0.8 | 0.8 | 0.8 |
| % Steam (2) | 0 | 0 | 20 | 10 |
| Salt Bath, °C. | 406 | 410 | 410 | 398 |
| Time, Hrs | 5 | 10 | 5 | 5 |
| ANALYSIS OF CATALYST |  |  |  |  |
| % Cl Removed | 75 | 88 | 98 | 97 |
| SA, m$^2$/g | 10.3 | 19.2 | 20.8 | 22.1 |
| V$^{ox}$ | 4.20 | 4.13 | 4.14 | 4.19 |

(1) Volume % propane in air.
(2) Volume % steam in feed.

The results shown in Tables 3 and 4 demonstrate that chloride can be removed from the pelletized catalyst using oxygen and propane feed both with and without steam to more than 90% chloride removal. An enhancement in chloride removal occurs with the addition of steam as shown by comparing Examples 1 and 4. With 20% steam the chloride removal is increased by 28%. In the absence of propane as shown in Comparative Example 2 only 39% chloride is removed and the catalyst is excessively oxidized to an oxidation state of 4.37. In Example 1 with propane, the V$^{ox}$ is reduced to 4.13 and even lower to 4.07 in Example 4 in the presence of 20% steam. This indicates that propane provides a reducing environment during the process. The surface area of the catalyst does increase with the chloride removal and does correspond to the transformation to the active vanadyl pyrophosphate phase determined by XRD analysis.

The removal of chloride can be accomplished also at lower temperatures with steam as shown in Example 8 which was at 398° C. with 10% steam as compared with Example 7 at 410° C. with 20% steam.

FLUID BED TESTS

Catalyst precursor was prepared by the preparative procedure described above through the oven drying for 16 hours at 150° C. The precursor was crushed and calcined at 260° C. under nitrogen for about 3 hours. 575g samples having a 30–60 mesh particle size were charged to a 3 inch ID fluidized bed reactor for activation. The reactor was heated in a bed of fluidized sand and the temperature ramped at 1° C./min to the desired reaction temperature which was then maintained. The precursor was fluidized by passage of a gas mixture comprised of oxygen, nitrogen, propane and steam as needed. The following Tables 5 and 6 show the activation conditions and the analytical results.

TABLE 5

CATALYST PRECURSOR ACTIVATION WITH PROPANE TO REMOVE CHLORIDES

| EXAMPLE | 9 | 10 | 11 | 12 |
|---|---|---|---|---|
| % Propane (1) | 0.68 | 1.36 | 1.36 | 1.47 |
| % Oxygen (1) | 19 | 3.6 | 3.6 | 3.9 |
| % Steam (1) | 10 | 10 | 10 | 30 |
| Temp. °C. | 375 | 375 | 400 | 375 |
| Time, Hrs | 2 | 2 | 2 | 1 |
| ANALYSIS OF CATALYST |  |  |  |  |

TABLE 5-continued

CATALYST PRECURSOR ACTIVATION WITH PROPANE TO REMOVE CHLORIDES

| EXAMPLE | 9 | 10 | 11 | 12 |
|---|---|---|---|---|
| % Cl Removed | 94 | 86 | 91 | 96 |
| SA, m²/g | 19.9 | 39.1 | 34.2 | 24.4 |
| $V^{ox}$ | 4.31 | 4.15 | 4.15 | 4.12 |

(1) Volume % in reaction feed mixture; balance is nitrogen.

TABLE 6

CATALYST PRECURSOR ACTIVATION WITH PROPANE TO REMOVE CHLORIDES

| EXAMPLE | 13 | 14 | 15[2] | 16[2] |
|---|---|---|---|---|
| % Propane (1) | 1.47 | 1.36 | 1.36 | 1.36 |
| % Oxygen (1) | 3.9 | 3.6 | 3.6 | 3.6 |
| % Steam (1) | 30[3] | 10[3] | 10 | 10[3] |
| Temp. °C. | 375 | 425 | 400 | 400 |
| Time, Hrs | 1 | 1 | 2 | 2 |
| ANALYSIS OF CATALYST | | | | |
| % Cl Removed | 96 | 96 | 94 | 94 |
| SA, m²/g | 27.2 | 29.9 | 42.7 | 41.5 |
| $V^{ox}$ | 4.16 | 4.16 | 4.11 | 4.09 |

(1) Volume % in the reaction feed mixture; balance is nitrogen.
[2] The temperature ramp rate was increased from 1 to 3° C./min.
[3] Steam was introduced at about 260° C.

CATALYST EVALUATIONS

Various of the catalysts activated as described in Tables 5 and 6 were pelletized to 3/16" by 3/16" tablets with a 1/16" central hole and evaluated in the oxidation of n-butane to maleic anhydride in a fixed bed reactor in accordance with the following.

The reactor was 5 foot stainless steel tube, 1 inch outside diameter, packed with a 3.5 foot catalyst bed (3/16"×3/16" tablet with a 1/16" center hole) and with inert 1/4 inch Alundum pellets on top of the catalyst material to a height 33% of the height of the catalyst. The reactors were encased in a 7% sodium nitrate; 40% sodium nitrite' 53% potassium nitrite eutectic mixture constant temperature salt bath. The catalyst was loaded in the reactor and conditioned by a slow bring-up of the catalyst to operating temperature at the rate of 5° to 20° C. per hour achieved by heating the reactor and adjusting the gas flow from 0.5 to 1.5 mole % butane in air at an initial flow of GHSV of 900⁻¹ hours up to 2500⁻¹ hours while maintaining a desired conversion level, e.g., about 75 mole %, the procedure requiring, in general, several days. The initial temperature of the salt bath was about 250° C. (a point where the salt bath is molten).

The throughput was achieved in relation to the maximum salt bath temperature and a maximum hot spot. The hot spot was determined by a probe through the center of the catalyst bed. The temperature of the salt bath could be adjusted to achieve the desired relationship between the conversion and flow rates of the n—$C_4$/air mixture (e.g. gas hourly space velocity—GHSV). The flow rate was adjusted to conversion and the temperature relations given above.

The C, S and Y used in reporting reaction results have the following meaning and relationship C. (conversion)×S (selectivity)=Y (yield); where:

$$\% \text{ Conversion} = \frac{\text{moles n-butane reacted}}{\text{moles n-butane fed}} \times 100$$

$$\% \text{ Selectivity} = \frac{\text{moles maleic anhydride produced}}{\text{moles n-butane reacted}} \times 100$$

The term "weight yield" means the amount of maleic anhydride produced from a given amount of n-butane, calculated as follows:

$$\text{wt yield} = \frac{98 \text{ (moles of maleic anhydride)}}{58 \text{ (moles wt. of butane)}} \times \text{mole \% yield}$$

TABLE 8

PERFORMANCE OF PROPANE ACTIVATED CATALYST

| EXAMPLE | COMP. | 9 | 10 | 11 | 12 | 13 | 14 | 15 | 16 |
|---|---|---|---|---|---|---|---|---|---|
| Run Time, hrs | 860 | 1060 | 688 | 913 | 781 | 864 | 52 | 652 | 636 |
| Salt Bath, Temp °C. | 404 | 399 | 409 | 404 | 413 | 512 | 393 | 410 | 413 |
| Hot Spot, Temp °C. | 464 | 453 | 456 | 457 | 457 | 468 | 425 | 466 | 467 |
| GHSV, hr⁻¹ | 2500 | 2500 | 2250 | 2500 | 2250 | 2500 | 2000 | 2250 | 2250 |
| Vol % Butane in Feed | 1.30 | 1.29 | 1.14 | 1.25 | 1.12 | 1.18 | 1.01 | 1.15 | 1.17 |
| Pressure, psig | 20 | 20 | 20 | 20 | 20 | 20 | 21 | 21 | 20 |
| % Conversion | 80.9 | 80.1 | 79.8 | 80.9 | 79.7 | 80.4 | 79.4 | 80.1 | 80.5 |
| % Selectivity | 68.5 | 71.4 | 69 | 69 | 68.1 | 68.8 | 65.9 | 65.1 | 66.8 |
| Wt % yield, calc. | 93.7 | 96.7 | 93.1 | 94.3 | 91.7 | 93.5 | 88.4 | 88.1 | 90.9 |

The data indicate that more than 86% of chlorides can be removed in all the propane activation tests in the fluid bed reactor. However, differences in catalyst characteristics were observed in the surface areas, $V^{ox}$ and catalytic performance based on the activation conditions. The catalyst which was activated with oxygen rich feed gas (Example 9) had a lower surface area but a higher $V^{ox}$ than catalysts activated under oxygen lean conditions (Examples 10–12). Performance of these catalysts is discussed below. The catalyst in Example 9 achieved both 94% chloride removal and good catalytic activity highlighting the benefits of this invention. The catalyst of Example 9 showed better selectivity and yield than the fresh catalyst (Comparative Example) which was activated with butane in the reactor. Furthermore, the catalyst of Example 9 had a lower hot spot temperature than the Comparative Example (453° v. 464° C.). At 860 life hours, the catalyst in Example 9 had 70.9% selectivity which was higher by 2% than the comparative catalyst.

With the change from oxygen rich, propane lean activation (Example 9) to oxygen lean and higher propane concentration with 10% steam activation, the surface area increased from about 20 to 34–39 m$^2$/g and the V$^{ox}$ was lowered form 4.31 to 4.16. An increase in activation temperature from 375° to 400° C. (Example 10 v. 11) resulted in an increase in the chloride removal from 86 to 91%. The catalytic activity of the catalyst of Example 11 (activated at 400° C.) was higher than that of Example 10 (activated at 375° C.) although both catalysts had similar selectivities (69%). However, the feed throughput (SV×% C$_4$) was different. Due to the high hot spot of 456° C. further increase in SV and feed was limited for Example 10. For essentially the same hot spot of 457° C., the catalyst of Example 11 operated at higher SV and % butane (2500 hr$^{-1}$, and 1.25% C$_4$) The activation conditions for Example 11 accomplished good chloride removal (91%) and a comparable performance to the comparative fresh catalyst. The performance of the catalyst in Example 11 was the best among the catalysts activated with propane under oxygen lean conditions with a chloride removal of greater than 90%.

In Examples 12 and 13 the steam level was increased from 10 to 30%. The difference in the activation procedures for these two examples was that in Example 13 the steam was introduced at 260° C. whereas in Example 12 it was introduced at 375° C.

The major effect in increasing the steam from 10 to 30% was the increase in chloride removal from 86 to 96% (Example 10 v. Example 12). Furthermore, the change resulted in a lowering of the SA from 39 to 24 m$^2$/g but had little effect on the V$^{ox}$. However, although these catalysts had effective chloride removal their performance was not as good as the comparative catalyst in that there was lower activity as indicated by the high salt bath temperature of 412°–413° C. Furthermore, due to the hot spot of 468° C. in Example 13, any further increase in feed from 1.18 to 1.30% butane might have resulted in an increase in the hot spot to above 470° C.

The activation conditions for Examples 15 and 16 were the same as those for Example 11 except the temperature ramp rate from 260° C. to 400° C. was increased form 1° to 3° C./min. The increase in ramp rate resulted in 94% chloride removal but was less desirable since it produced a catalyst with inferior performance to the comparative catalyst, illustrating that excessively fast activation is undesirable as it lessens the catalytic performance.

In especially advantageous practice, the calcination and activation procedures can be carried out continuously in the same reactor which is, of course extremely useful as applied to commercial operation.

In order to illustrate this, the following are presented:

Example A

About 630 g of 30–60 mesh particle size of the dry powder catalyst precursor described in Example 1 were charged to a 3 inch ID fluidized bed reactor and heated as described in Example 9. The dry powder was calcined at 260° C. in this reactor for 3 hours under nitrogen. After cooling to room temperature the catalyst was analyzed, the results are summarized in Table A. The catalyst contained 0.606% chloride.

Example B

The same procedures of Example A were followed except that at the end of the calcination step the reactor was not cooled down but the catalyst was activated thereafter with a gas feed composed of 0.68% propane/19% oxygen/10% steam/nitrogen-balance at 375° C. for 2 hours. Steam was introduced at 260° C. and the temperature between 260° to 375° C. was increased at a rate of 1° C./min. The activated catalyst showed 94% chloride removal. A summary of the results are shown in Table A.

The results show that after calcination at 260° C. the catalyst contained 0.606% chlorides which through the subsequent activation step with propane about 94% of the chloride were removed. Furthermore, at the end of the calcination step under nitrogen, the oxidation state of the catalyst was 3.64 which does increase to 4.22 after the activation step with propane specified in Example B. In addition, the XRD analysis clearly show a change in the crystallinic phase from the vanadyl hydrogen phosphate hemihydrate to the vanadyl pyrophosphate. With the change in the crystallinic phase the surface area drops from 53.4 to 24.7 m$^2$/g. The characteristics of the material in Example B are similar to those of Example 9 illustrating that the catalyst activation can be carried out continuously in the fluid bed reactor starting with the dry powder from a calcination step at 260° C. under nitrogen.

TABLE A

| | ACTIVATION WITH PROPANE STARTING WITH A DRY SAMPLE | |
|---|---|---|
| EXAMPLE | A | B |
| % Cl | 0.606 | 0.035 |
| SA, m$^2$/g | 53.4 | 24.7 |
| V$^{ox}$ | 3.62 | 4.22 |
| XRD | hemihydrate phase | pyrophosphate phase |

I claim:

1. A process for the conversion of a chloride containing vanadium/phosphorus mixed oxide catalyst precursor to a vanadium/phosphorus mixed oxide catalyst containing not more than 0.2 wt % chloride which is useful for the oxidation of non-aromatic hydrocarbons to maleic anhydride which comprises drying the precursor at a temperature up to 180° C., calcining the dried precursor at a temperature of 200°–300° C., and activating the calcined precursor by contact with a gas comprised of molecular oxygen and an organic reducing agent at a temperature in the range 350°–550° C.

2. The process of claim 1 wherein the catalyst contains not more than 0.1 wt % chloride.

3. The process of claim 1 wherein the catalyst contains not more than 0.05 wt % chloride.

4. The process of claim 1 wherein the said gas also comprises water.

5. The process of claim 1 wherein the reducing agent is a hydrocarbon having 2–5 carbon atoms.

6. The process of claim 1 wherein the reducing agent is a hydrocarbon having less than 4 carbon atoms.

7. The process of claim 1 wherein the said calcining is carried out under inert gas atmosphere.

8. The process of claim 1 wherein the said calcining is carried out under nitrogen atmosphere.

9. The process of claim 1 wherein the reducing agent is propane.

10. The process of claim 1 wherein the activating gas comprises by volume 1 to 21% oxygen, 0.1 to 2% propane, and 1 to 60% steam.

11. A vanadium/phosphorus mixed oxide catalyst prepared by the process of claim 1.

12. The process of claim 1 wherein the reducing agent is propane.

* * * * *